United States Patent [19]

Johdai et al.

[11] Patent Number: 4,852,867
[45] Date of Patent: Aug. 1, 1989

[54] COPYING APPARATUS HAVING AN AUTOMATIC DOCUMENT FEEDER WITH DOCUMENT CIRCULATING FUNCTION AND A PAPER CONTAINER WITH PAPER BINDING FUNCTION

[75] Inventors: Akiyoshi Johdai; Keichi Kinoshita; Toshio Matsui, all of Toyokawa, Japan

[73] Assignee: Minolta Camera Kabushiki Kaisha, Osaka, Japan

[21] Appl. No.: 105,561

[22] Filed: Oct. 8, 1987

[30] Foreign Application Priority Data

Oct. 9, 1986 [JP] Japan ................. 61-240725
Oct. 9, 1986 [JP] Japan ................. 61-240726

[51] Int. Cl.$^4$ .............................................. B42B 1/02
[52] U.S. Cl. ........................................ 270/53; 270/58
[58] Field of Search ........................... 270/37, 53, 58

[56] References Cited

U.S. PATENT DOCUMENTS

| | | | |
|---|---|---|---|
| 3,697,063 | 10/1972 | Greenfield et al. | 271/4 |
| 3,709,595 | 1/1973 | Turner et al. | 355/14 |
| 3,944,207 | 3/1976 | Bains | 270/58 |
| 3,945,728 | 3/1976 | Crandell | 355/75 |
| 4,073,391 | 2/1978 | O'Brien et al. | 214/65 |
| 4,076,408 | 2/1978 | Reid et al. | 355/14 |
| 4,134,672 | 1/1979 | Burlew et al. | 355/14 |
| 4,145,037 | 3/1979 | Mol | 270/53 |
| 4,227,275 | 10/1980 | Söderberg | 11/1 |
| 4,238,066 | 12/1980 | Brooke | 227/39 |
| 4,248,413 | 2/1981 | Fox | 270/53 |
| 4,248,525 | 2/1981 | Sterrett | 355/14 |
| 4,281,920 | 8/1981 | Cross | 355/75 |
| 4,295,733 | 10/1981 | Janssen et al. | 355/14 SH |
| 4,313,670 | 2/1982 | Caldwell | 355/3 R |
| 4,361,393 | 11/1982 | Noto | 355/3 |
| 4,368,972 | 1/1983 | Naramore | 355/14 |
| 4,371,155 | 2/1983 | Astero et al. | 270/53 |
| 4,376,529 | 3/1983 | George et al. | 270/53 |
| 4,385,827 | 5/1983 | Naramore | 355/14 |
| 4,411,515 | 10/1983 | Kukucka et al. | 355/14 SH |
| 4,424,963 | 1/1984 | Bartholet et al. | 270/53 |
| 4,497,478 | 2/1985 | Reschenhofer | 270/53 |
| 4,549,804 | 11/1985 | Braun et al. | 355/14 |
| 4,564,185 | 1/1986 | Hamlin et al. | 270/53 |
| 4,566,782 | 1/1986 | Britt et al. | 355/14 SH |
| 4,582,421 | 4/1986 | Hamlin et al. | 355/72 |
| 4,620,782 | 11/1986 | Kurando et al. | 355/14 SH |
| 4,647,034 | 3/1987 | Sawa | 271/293 |
| 4,674,732 | 6/1987 | Hori | 270/53 |
| 4,674,862 | 6/1987 | Abuyama | 355/14 SH |
| 4,687,191 | 8/1987 | Stemmle | 270/53 |
| 4,730,204 | 3/1988 | Satoh et al. | 355/14 SH |

FOREIGN PATENT DOCUMENTS

| | | |
|---|---|---|
| 99250 | 1/1984 | European Pat. Off. . |
| 2732673 | 9/1978 | Fed. Rep. of Germany . |
| 3701450A1 | 7/1987 | Fed. Rep. of Germany . |
| 55-111956 | 8/1980 | Japan . |
| 57-72537 | 5/1982 | Japan . |
| 57-131667 | 8/1982 | Japan . |
| 59-43765 | 3/1984 | Japan . |
| 60-22127 | 2/1985 | Japan . |
| 60-150061 | 8/1985 | Japan . |
| 60-183461 | 9/1985 | Japan . |
| 60-248563 | 12/1985 | Japan . |
| 61-72569 | 4/1986 | Japan . |
| 61-95363 | 5/1986 | Japan . |
| 61-145069 | 7/1986 | Japan . |
| 61-204626 | 9/1986 | Japan . |
| 61-238041 | 10/1986 | Japan . |
| 61-261096 | 11/1986 | Japan . |
| 62-9367 | 1/1987 | Japan . |
| 2185465A | 7/1987 | United Kingdom . |

OTHER PUBLICATIONS

Xerox Disclosure Journal, vol. 2, No. 5, Sep./Oct. 1977.

*Primary Examiner*—Robert E. Garrett
*Assistant Examiner*—Therese M. Newholm
*Attorney, Agent, or Firm*—Burns, Doane, Swecker & Mathis

[57] ABSTRACT

A copying apparatus comprises an image forming device, an automatic document feeder which has a document circulating function and a paper container which has a stapling function. The copying apparatus allows the selection either a stapling mode to staple copying papers or a non-stapling mode. If the non-stapling mode is selected during the stapling mode copying operation, the apparatus can execute the non-stapling mode for the rest of sets of copying papers after the completion of the stapling operation for the currently processed a set of copying papers.

5 Claims, 17 Drawing Sheets

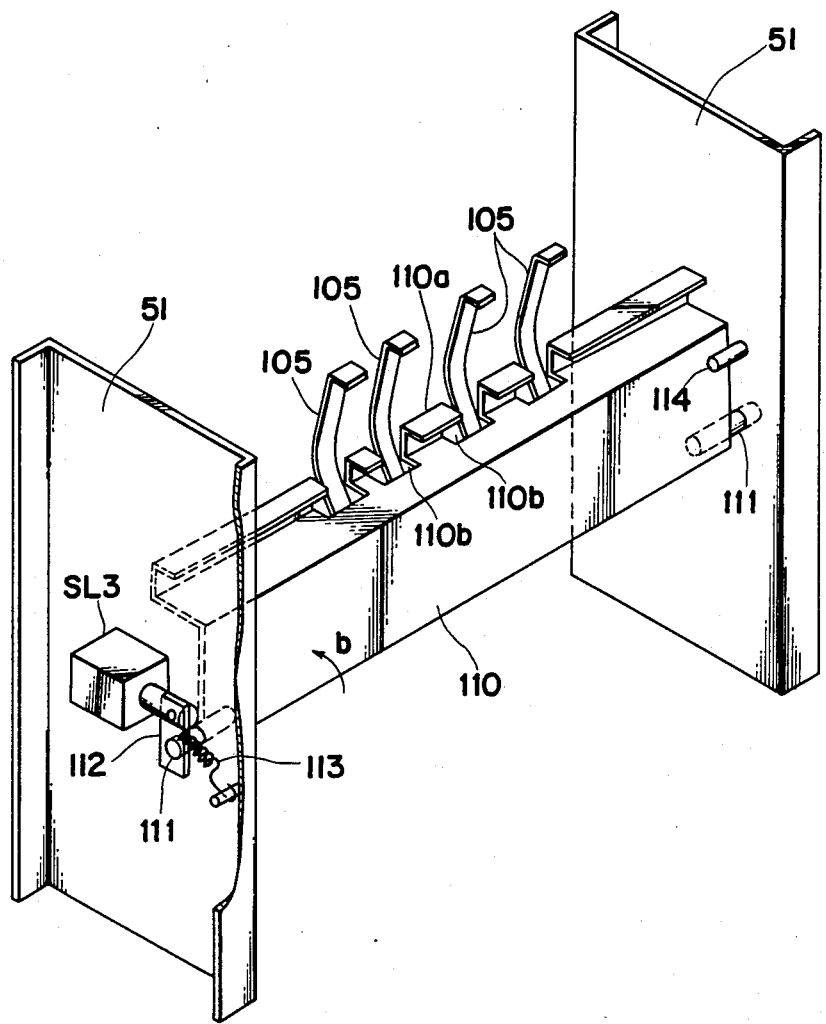

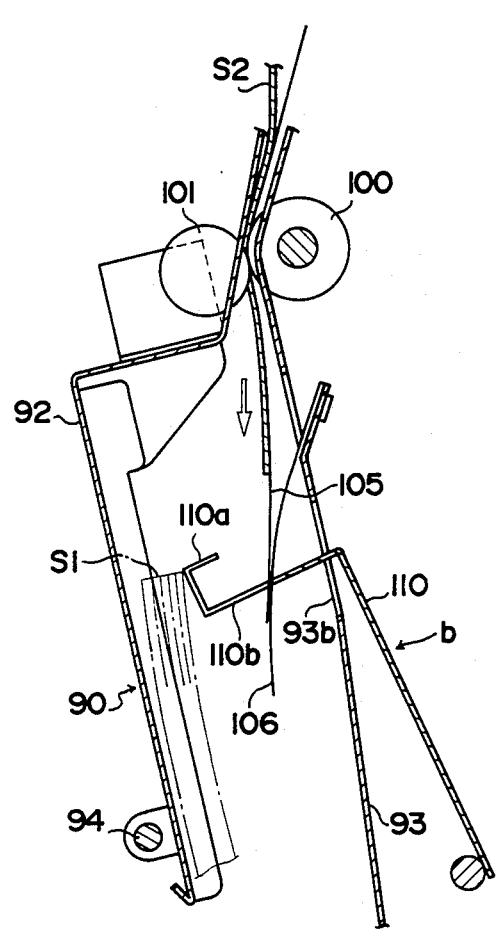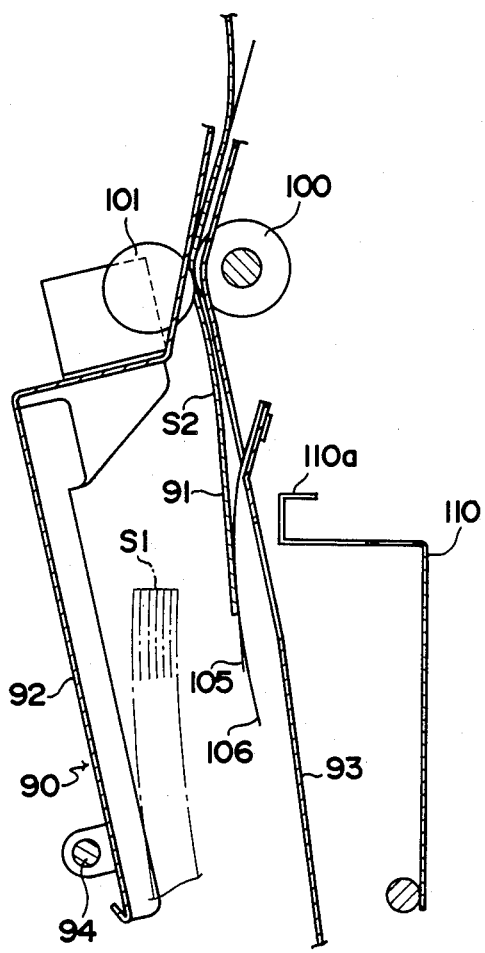

COPYING APPARATUS HAVING AN AUTOMATIC DOCUMENT FEEDER WITH DOCUMENT CIRCULATING FUNCTION AND A PAPER CONTAINER WITH PAPER BINDING FUNCTION

BACKGROUND OF THE INVENTION

1. Field of the Invention

The present invention relates to a copying apparatus, in particular, a copying apparatus having an automatic document feeder with a document circulating function with which one set of documents are circulated from the document container via an exposure area to the same document container, and a paper container which has a function to bind the copying papers ejected from a copying machine.

2. Description of Related Art

This application is related to a copending application Ser. No. 07/108,899, filed Oct. 15, 1987, by A. Johdai et al., and entitled "Paper Container With A Paper Binding Function".

As for a conventional automatic document feeder with a document circulating function and a paper container with a paper binding function which are both installed on a copying machine, such devices are well known as those disclosed in U.S. Pat. Nos. 4,076,408, 4,248,525, 4,549,804 and 3,944,207, and in Japanese Patent Laid Open Publication Nos. 60-248563 and 57-72537, and in European Patent Publication No. 99250. Among these devices, the similar paper container, usually known as a finisher, has an arrangement where the copying paper undergone copying operation are stored and aligned on a tray or the like, then stapled and transferred onto a stack unit, thereby stacked and stored.

However, when such a paper container is attached to and operated combinedly with a copying machine having an automatic document feeder with a document circulating function, and if the stapling mode is selected, the initially entered conditions, for example, the copying operation for ten sets, all the ten sets are unconditionally subjected to the stapling operation. Accordingly, when it is required that only eight sets of copying papers should be stapled among ten sets of copying papers should be stapled should be processed without being stapled, eight sets of copying papers are first processed in the stapling mode, then the number of sets is set to two and the non-stapling mode is designated at the same time to perform the copying operation again. However, such a procedure is timeconsuming. Further, when it is found during the stapling mode operation that no more sets of copying papers should reqire stapling, it is necessary to cancel the whole copying operation in order to cancel the stapling mode. Therefore, such copying apparatus caused much inconvenience.

SUMMARY OF THE INVENTION

Therefore, the object of the present invention is to provide a copying apparatus which, if the non-stapling mode is selected during the stapling mode copying operation, can execute the non-stapling mode for the rest of sets of copying papers after the completion of the stapling operation for the currently processed a set of copying papers. Accordingly, this arrangement eliminates a procedure to switch the operation mode of the apparatus to the nonstapling mode and provides a copying apparatus which allows simple operational procedures.

To attain the above object, a copying apparatus according to the present invention comprises an image forming means, an automatic document feeder with a document circulating function, a paper containing means, a copying paper stapling means, means for designating the number of sets of copying papers, first control means to keep both the image forming means and the automatic document feeder operating until the completion of a number of image forming sequences required for completing a predetermined sets of copying papers, means for selecting either a stapling mode or a non-stapling mode, second control means to operate the stapling means, and third control means for switching the operation mode to the non-stapling mode when the non-stapling mode is selected during the stapling mode copying operation. Additionally, instead of the third control means, the copying apparatus may be provided with another control means which permits the switching to the nonstapling mode.

BRIEF DESCRIPTION OF THE DRAWINGS

These and other objects and features of the present invention will become apparent from the following description taken in conjunction with the preferred embodiments thereof with reference to the accompanying drawings, in which:

FIG. 1 through FIG. 16 show an embodiment of the present invention;

FIG. 1 is an internal composition of a paper container;

FIG. 2 is a side elevational view taken in the direction of the arrow E in FIG. 1;

FIG. 3 is a perspective view of the pressing member;

FIG. 4 and FIG. 5 are explanatory drawings showing paper transporting into the stapling tray;

FIG. 6 is a schematic block diagram showing a paper container with a stack unit;

FIG. 7 is a schematic block diagram showing a copying machine and a paper container;

FIG. 8 is a plan view showing an operation panel of the paper container;

FIG. 9 is a diagram showing a control circuit;

FIG. 10 is a flow chart showing a main routine of the first CPU;

FIG. 11 is a flow chart showing a subroutine for signal processing;

FIG. 12 is a flow chart showing a main routine of the second CPU;

FIG. 13 is a flow chart showing a subroutine for canceling a stapling mode;

FIG. 14 is a flow chart showing a subroutine for mode setting;

FIG. 16 is a flow chart showing a subroutine for paper stapling/stacking;

DETAILED DESCRIPTION OF THE INVENTION

The embodiment of a copying apparatus according to the invention is described, below, by referring to the accompanying drawings.

[General constitution including copying machine and ADF]

Figure 7:
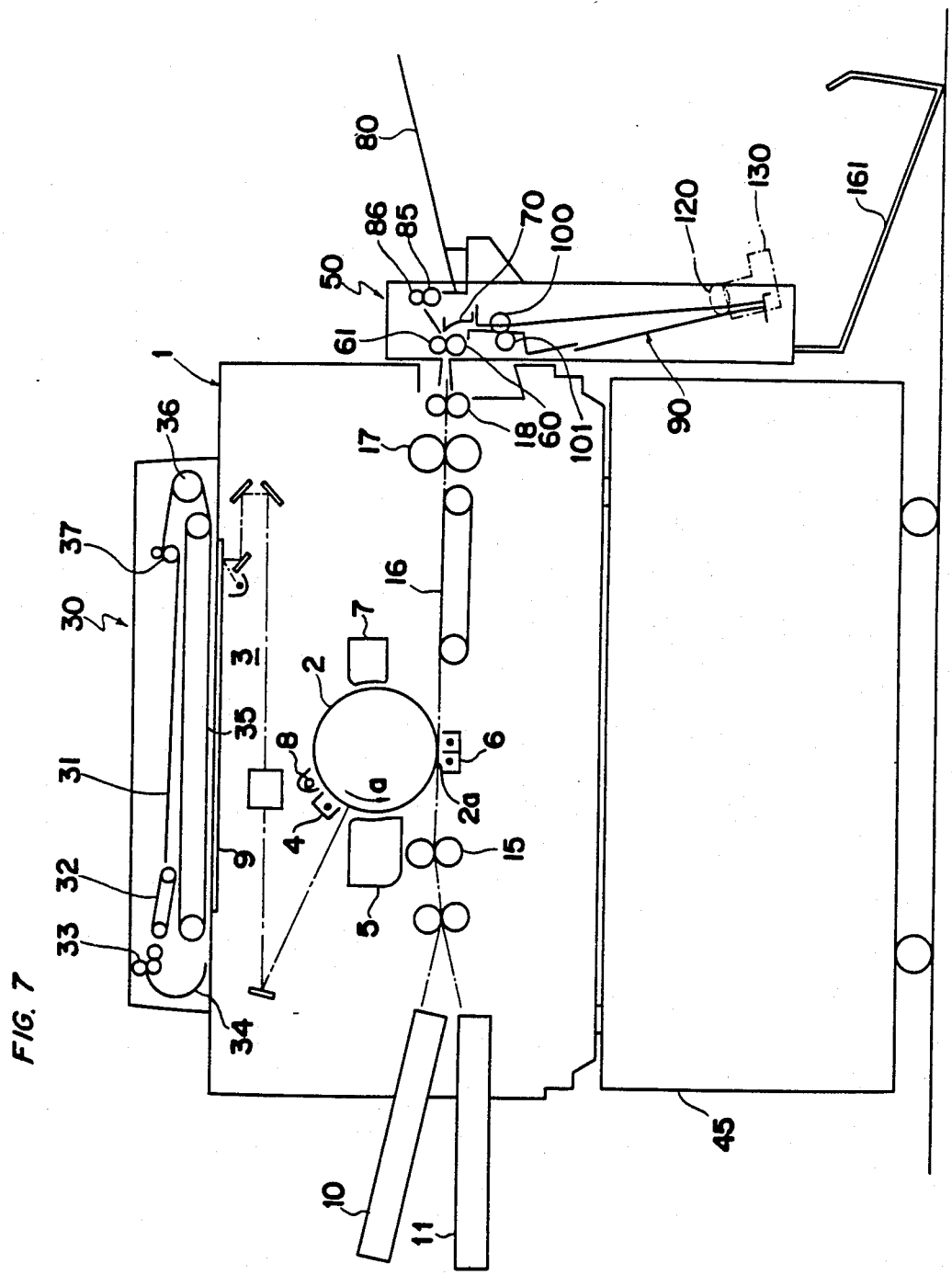

First, the general constitution of a copying machine 1 is described, by referring to FIG. 7.

A copying machine 1 is placed on a desk 45, and an automatic document feeder 30 with a document circulating function, which is hereinafter referred to as ADF is disposed on the top surface thereof. Inside the copying machine 1, there is a photosensitive drum 2 rotatable in the arrow (a) direction. Around the drum 2, such well known image forming elements are arranged as an optical system 3, an electrifying chharger 4, a developing device 5, a transfer charger 6, a cleaning device 7, an eraser lamp 8 and others. These elements and the copying processes of the elements are so well known that the detailed description of them is omitted.

Copying papers which are loaded in an automatic paper feeder cassette 10 or 11, are fed sheet by sheet from a specific cassette selected from the cassettes 10 and 11. Then, by a pair of timing rollers 15, a copying paper is synchronized with a toner image formed on the circumferential surface of the photosensitive drum 2 and its transported to a transfer portion 2a. After the transfer processing, the copying paper is supplied to a fixing device 17, by a conveyor belt 16, where toner image is fixed, then the paper is ejected by a pair of ejection rollers 18.

The ADF 30 generally comprises a document deck tray 31, a document feeder belt 32, a pair of document feeder rollers 33, a diverting guide plate 34, a transport belt 35, a diverting roller 36 and a pair of ejection rollers 37. The ADF 30 transports one set of documents sheet by sheet from the last page. One set of documents are placed on the tray 31, with the reverse side of the last page positioned downward, and drawn out sheet by sheet from the last page by the travel of the feeder belt 32. Then, the document is fed to between the transport belt 35 and a document deck glass 9, via the pair of document feeder rollers 33 as well as the diverting guide plate 34. Next, the document is set at the specified position on the document deck glass 9 by the travel of the transport belt 35 to be subjected to one sequence of irradiation with the optical system 3. After the imagewise exposure, the document is transported by the transport belt 35 from the document deck glass 9 toward the right side in FIG. 7, where diverted by the diverting roller 36, then ejected by the pair of ejection rollers 37 onto the stack of other documents placed on the tray 31, with the surface having an image is upward.

Incidentally, one sequence of imagewise exposure is defined as one cycle of copying operation. The ADF 30 repeats one cycle of copying operation up to the number of cycles which has been entered with unshown ten numerical keys. Additionally, the number of documents to be duplicated in one cycle of copying operation is also entered with the similar keys. Further, the ADF 30 is disposed to be freely lifted from and lowered onto the copying machine 1. Therefore, with the ADF in the lifted position, a document can be manually set, for a copying operation, on the document deck glass 9. The ADF 30 does not operate when lifted. Lifting the ADF 30 is detected by an unshown switch located in the vicinity of the document deck glass 9.

Wih a paper container in this embodiment of the invention, copying papers ejected from the copying machine 1 are selectively received either by an ejection tray 80 or by a stapling tray 90, where aligned, then stapled with a stapler 130. Accordingly, once a plural sets of copying papers are duplicated in used the ADF and to stapling operation, these sets of copying papers are sequentially stored on the stapling tray 90. Then, when one cycle of copying operation has completed, the stapler 130 is actuated based on a stapling signal outputted from the copying machine 1, in order to staple one set of copying papers. The one set of copying papers stapled is stacked in a stack box 161.

[Constitution of finisher unit]

The constitution of a finisher unit 50 is hereinafter described by referring to FIGS. 1, 2 and 3.

The finisher unit 50 generally comprises rollers 60 and 61 for receiving a copying paper, a diverting member 70 for diverting a transport course, a paper ejection tray 80, paper ejection rollers 85 and 86 for ejecting a copying paper onto the ejection tray 80, a stapling tray 90, paper transport rollers 100 and 101 for transporting a copying paper to the stapling tray 90, a pressing member 110 capable of pressing the upper portion of papers stored in the stapling tray 90, a paddle wheel 120 for aligning a copying paper stored in the stapling tray 90 relative to the corner (A) and a stapler 130.

A portion to receive a copying paper comprises, in addition to the above mentioned rollers 60 and 61, guide plates 62 and 63 laterally opposing to the pair of ejection rollers 18, and a guide plate 64 provided within the unit 50. A guide plate 65 extends from the receiving portion to the ejection rollers 85 and 86. The guide plate 65 can be lifted upwards on a pivot 66, so as to enable various procedures such as the removable of jammed papers. The roller 61 is mounted on the guide plate 65.

Incidentally, an ejection portion of the copying machine 1 has a neutralizing brush 19, and a photosensor SE1 which detects a copying paper.

Figure 1:
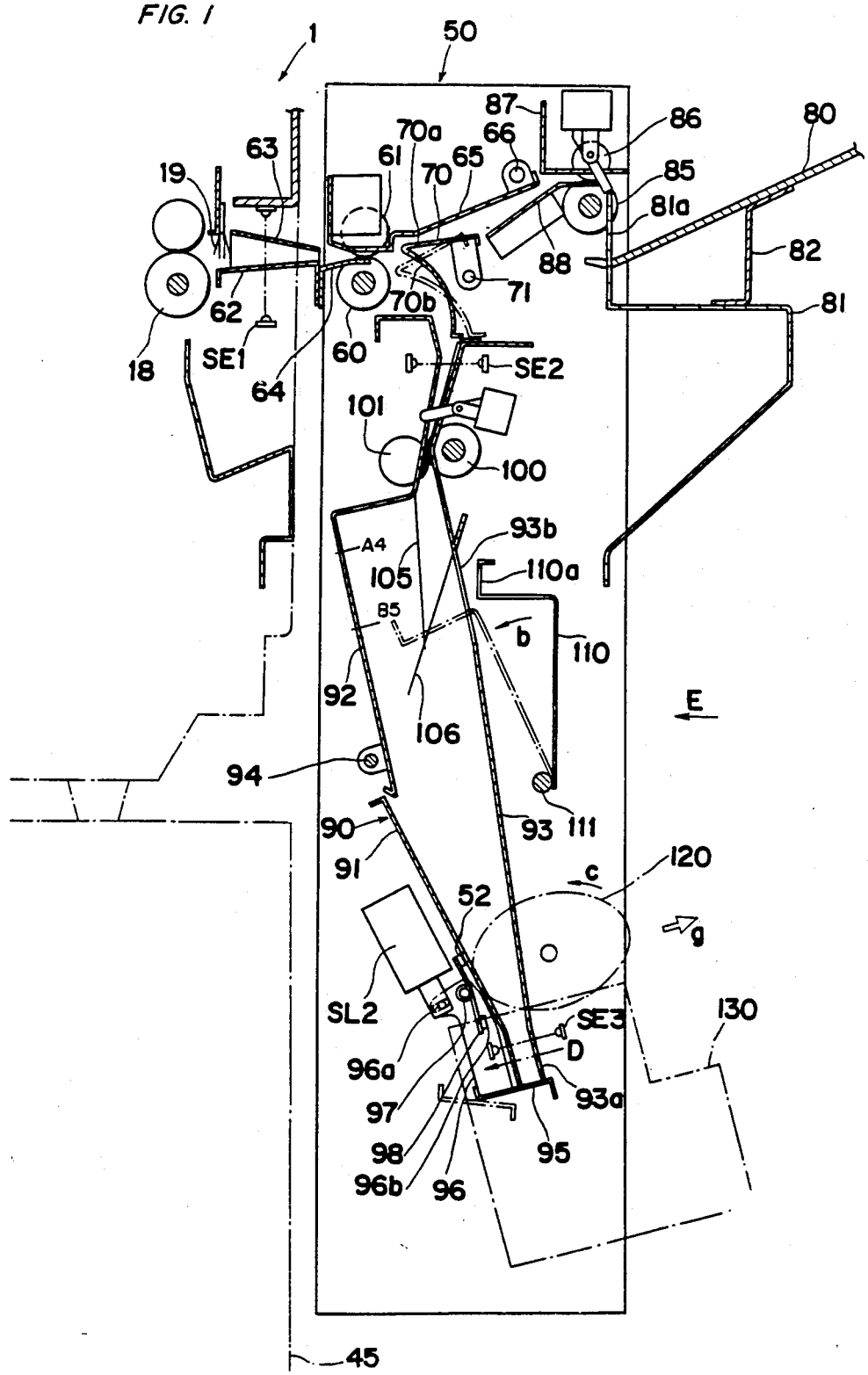

As shown in FIG. 1, a bill-shaped diverting member 70 is pivotally attached to a pivot 71, thereby turning ON an unshown solenoid shifts the member 70 from a position shown by the dashed line to a position shown by the solid line. At the position of the short dashed line, the diverting member 70 leads a copying paper to the paper ejection tray 80 side along the top surface 70a of the member 70. At the position of the solid line, the diverting member 70 leads a copying paper to the stapling tray 90 side along the inwardly curved surface 70b.

The paper ejection tray 80 is secured on the exterior of the unit 50 through support plates 81 and 82. The bottom end of the paper ejection tray 80 is located below the ejection rollers 85 and 86 and intersects with a stopper 81a to stop the trailing edge of a copying paper. Near the ejection rollers 85 and 86, guide plates 87 and 88 are disposed, while the ejection roller 86 is attached to the guide plate 87.

The stapling tray 90 comprises a main base plate 91, a guide plate 92, and a guide plate 93 facing both the main base plate 91 and the guide plate 92, and a stopper 95. The stapling tray 90 is disposed upright, slightly leaning toward the left. The upper portion of the guide plate 92 extends toward the vicinity of the inwardly curved surface 70b of the diverting member 70 and can be pivotally opened up counterclockwise on a pivot 94 in FIG. 1 so as to allow procedures such as the removal of jammed paper. The upper portion of the guide plate 93 opposes the upper portion of the guide plate 92 via a narrow space, and extends toward directly below the diverting member 70. To the lower portion of the guide plate 93, the area 93a faces the base plate 91 at the position lower than that of a paddle wheel 120 mentioned later, with the narrower space compared with other areas. More specifically, the space between the area 93a and the base plate 91 is slightly larger than the thickness of a specified number of copying papers which can be stored in the stapling tray 90. The reason for why the thickness in an area corresponding with the paddle wheel 120 is narrower and the thicknesses in other areas are larger is that it is intended to minimize the friction exerted between the already stored and aligned copying papers and the currently aligned paper in order to ensure that all the copying papers aligned to the alignment reference line (A') to (A').

Additionally, the area 93a is provided with a photosensor SE3 for detecting a copying paper transported into the stapling tray 90.

The stopper 95 forms the bottom plate of the stapling tray 90, and is rotatably attached to a pivot 97 through an arm 96. The arm 96 is connected with a solenoid SL2 via a pin 96a, thereby both ends of a torsion spring 98, coiled around the pivot 97, is engaged respectively with a projection 96b on the arm 96 and a projection 52 on the frame 5. Therefore, as shown in FIG. 1, when the solenoid SL2 is in the OFF status, the stopper 95 is in a shown by the solid line in FIG. 1 and closes the bottom of the stapling tray 90. On the other hand, once the solenoid SL2 is turned ON, the stopper 95 pivotally moves on the pivot 97 to a position shown by the dashed line to open the bottom of the stapling tray 90.

The transport rollers 100 and 101 are disposed at the area where the space between the upper portions of the above mentioned guide plates 92 and 93 is the narrowest. The transport rollers 100 and 101 transport a copying paper guided downwards along the inward curved side 70b of the diverting member 70. A photosensor SE2 for detecting a copying paper is disposed immediately above the similar rollers 100 and 101.

Strip-shaped flexible sheets 105 are attached to the upper portion of the plate 92. The flexible sheets 105 hang down in the stapling tray 90, through the side of the nip portion between the rollers 100 and 101. The bottom end of the flexible sheets 105 extends to the position slightly lower than that of the upper edge of a minimum size B5 paper as stored in the stapling tray 90, and reaches a neutralizing brush 106 attached to the guide plate 93. The flexible sheets 105, while a copying paper is transported to the staplng tray 90, provides the copying paper with a stiffness proportional to the thickness of the paper in order to ensure tha paper to be correctly transported into the stapling tray 90. Further, the flexible sheets 105 together with the neutralizing brush 106 touch and support the upper portion of the stored copying papers in order to prevent the copying paper from leaning toward the guide plate 92 or collapsing.

Additionally, the nip portion between the above mentioned transport rollers 100 and 101 is arranged so that a copying paper nipped may face the guide plate 93 side. This arrangement is provided in order to reduce contact friction between a copying paper being transported into the stapling tray 90 and copying papers already stored in the tray 90.

As shown in FIG. 3, the pressing member 110 is secured to two pivots 111 and 111 which are rotatably attached to frames 51 and 51. One pivot 51 is connected to a solenoid SL3 via an arm 112, and the arm 112 is drawn by a coil spring 113 in the direction reverse to an arrow (b). Therefore, when the solenoid SL3 is in the OFF status, the pressing member 110 is attracted by the drawing force of the coil spring 113 in the direction reverse to an arrow (b), and waits for another operation outside the guide plate 93, as shown by the solid line in FIG. 1, where the pressing member 110 touches a stopper pin 114. On the other hand, when the solenoid SL3 is turned ON, the pressing member 110 pivotally rotates on the pivots 111 and 111 in the direction of an arrow (b), and a head 110a of the similar member 110 is protruded through an opening 93b on the guide plate 93 into the stapling tray 90 in order to press the upper portion of copying papers stored in the stapling tray 90. Additionally, the head 110a is provided with notches 110b so as to prevent interference with the above mentioned flexible sheets 105 and neutralizing brush 106.

The paddle wheel 120 whose top is equipped with a plurality of radially-arranged blade elements is disposed at an angle of $\theta$ to the transporting direction on the surface for a copying paper. The axle 121 of the paddle wheel 120 is rotatably attached to a bracket 122 secured to the exterior of the guide plate 93. A part of the paddle wheel 120 protrudes through a long hole 93c formed on the guide plate 93 into the stapling tray 90. A motor M2 being rotatable in forward and reverse directions is connected with a gear 123 through an unshown reducing means. The gear 123 meshes with another gear 124 fixed to the axle 121, accordingly the paddle wheel 120 is rotatable in forward and reverse directions.

More specifically, the paddle wheel 120 rotating in the arrow (c) direction shifts a copying paper, which has been transported into the stapling tray 90, toward the corner (A) where the reference lines (A') and (A') intersect with each other. In this case, the peripheral velocity (V) of the paddle wheel 120 is predetermined so that the vertical component Via is larger than the peripheral velocity of the transport roller 100. However, the transporting force of the paddle wheel 120 is predetermined so as to be weaker than that of the transport rollers 100 and 101. Therefore, the transporting force of the paddle wheel 120 exerted on a copying paper and derived from the rotation in the direction of an arrow (c) works after the trailing edge of the paper has passed the nip portion between the rollers 100 and 101. The position of the copying paper which has passed the rollers 100 and 101 is indicated by A4 or B5 in FIG. 2. Additionally, the copying paper is transported based on the center line (CL) as a reference line.

Figure 2:
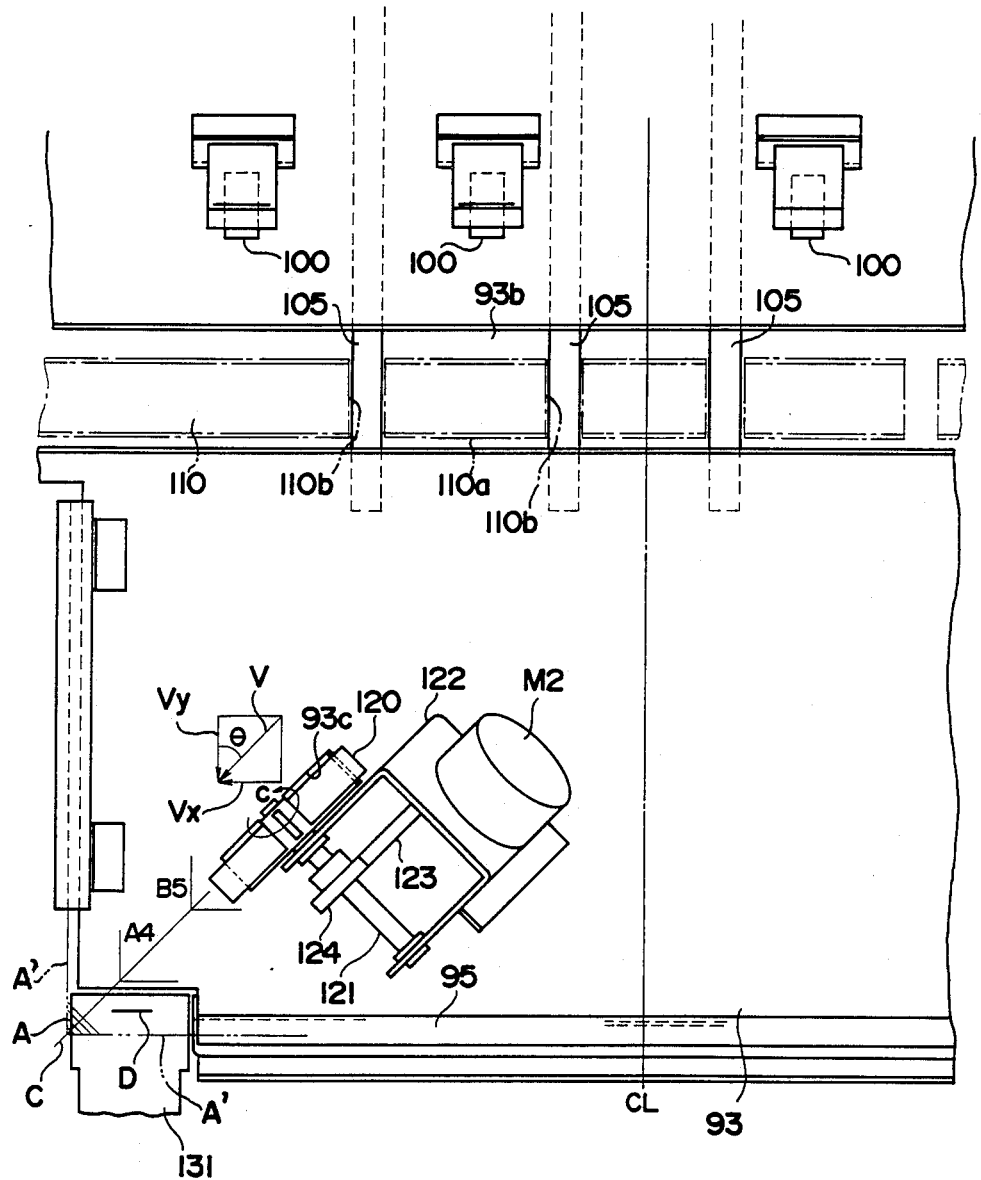

The inclination $\theta$ of the paddle wheel 120 is predetermined so that the trailing edge of a copying paper, when it has passed the transport rollers 100 and 101 and the transporting force of the paddle wheel 120 starts exerting on the paper, is substantially parallel with a straight line connecting the corner of a copying paper and the corner portion (A) in FIG. 2. This arrangement allow a copying paper to move directly to the alignment corner (A) by the rotation of the paddle wheel 120 via the shortest distance. Therefore, the alignment corner (A) should preferably be on a line (C) extending from the above corner of a copying paper and meeting the vertical line at an angle $\theta$. However, when the angle $\theta$ is smaller than 45 degrees, the corner (A) may be located below the extending line (C). When the angle $\theta$ is more than 45 degrees, the corner (A) may be above the similar line (C). Additionally, the positional relation in the vertical direction between the paddle wheel 120 and the pair of rollers 100 and 101 must be arranged so that a copying paper is subjected to the transporting force of either the paddle wheel 120 or the pair of feeder rollers 100 and 101.

The stapler 130 is a well-known electric type, wherein as shown in FIG. 2 a receiver 131 is disposed on the plane common to the base plate 91 of the stapling tray 90 to staple one set of copying papers stored and aligned in the stapling tray 90.

[Operation of the finisher unit]

The operation of the finisher unit 50 is described, below.

(Non-stapling mode)

The non-stapling mode is an operation mode to stack and store copying papers, which have been ejected from the pair of ejection rollers 18 on the copying machine 1, onto the paper ejection tray 80, without a stapling operation.

In this mode, the diverting member 70 is at the position shown by the dashed line in FIG. 1, thereby a copying paper received by the rollers 60 and 61 is guided both by the top side 70a of the diverting member 70 and by the guide plate 65, then is ejected by the paper ejection rollers 85 and 86 onto the paper ejection tray 80.

(Stapling mode)

Figure 6:
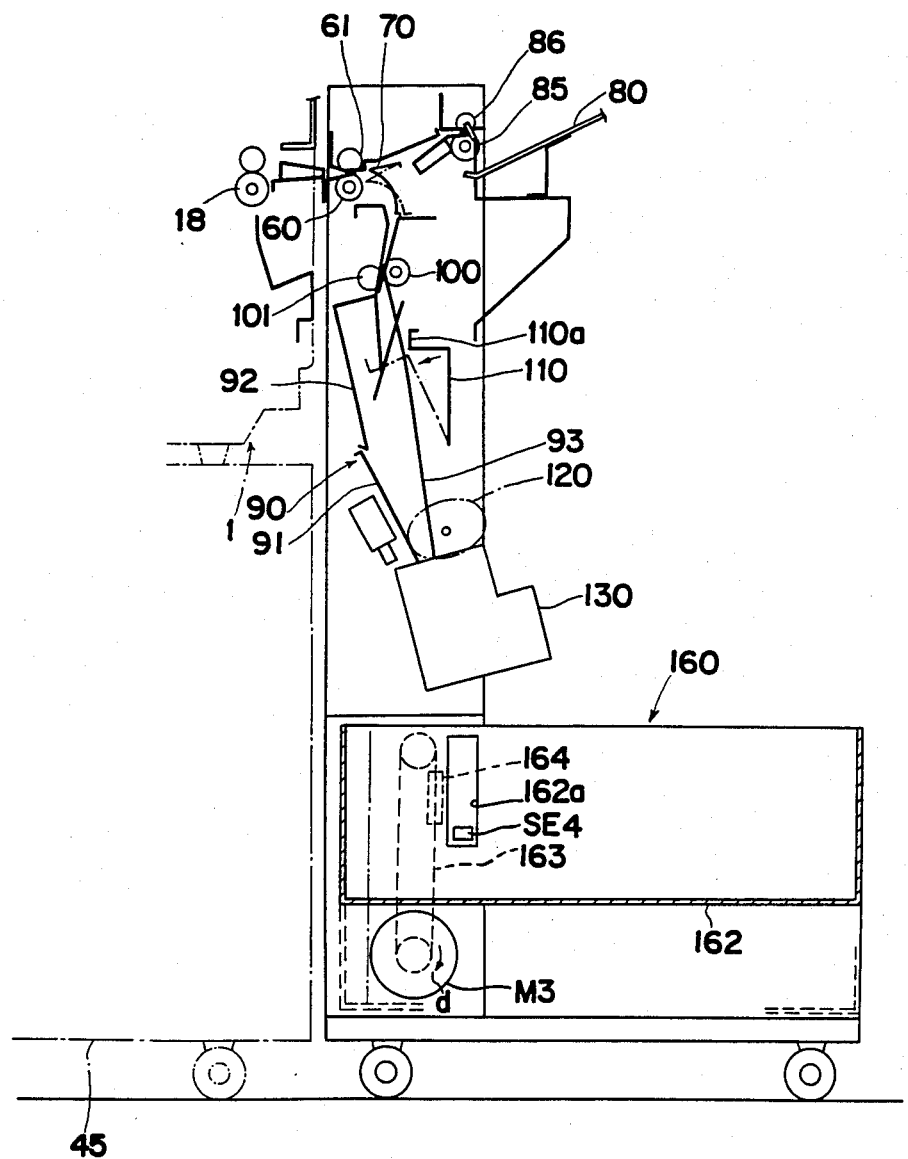

This mode is an operation mode where copying papers are stored and aligned in the stapling tray 90 and are stapled with the stapler 130, then are stacked in a stack box 161 (see FIG. 7) or in a stack unit 160 (see FIG. 6).

In this mode, the diverting member 70 is shifted to the position shown by the solid line in FIG. 1, thereby a copying paper introduced by the rollers 60 and 61 is guided both by the inwardly curved side 70b of the diverting member 70 and by the upper portions of the guide plates 92 and 93, and is transported by the rollers 100 and 101 in the stapling tray 90. Syncronously with the rotation of the transport rollers 100 and 101, the paddle wheel 120 is actuated to rotate forward in the direction of an arrow (c), thereby the copying paper whose trailing edge has left the rollers 100 and 101 receives the transporting force by the rotation of the paddle wheel 120 and moves toward the corner (A), where aligned. During this course, the copying paper receives the transporting force at the nip portion so as to face the guide plate 93 side based on the predetermined direction of the nip portion. At the same time, the copying paper is provided with stiffness proportional to the thickness as the flexible sheets 105 rubs the paper to minimize the friction with already stored copying papers, and consequently, the copying papers are stored in the staple tray 90 sheet by sheet. At the same time, the copying paper touches the neutralizing brush 106 ad is electrically neutralized. Additionally, the tips of the flexible sheets 105 and neutralizing brush 106 touch the upper portion of copying papers already stored in the stapling tray 90 in order to prevent the papers from leaning or collapsing.

Incidentally, when a copying paper is stored as it has been curled due to the heating of the fixing unit 17 and if the upper portion of the paper is warped through the guide plate 93, the next transported paper interferes with the upper portion of the curled paper already stored, thereby causing paper jamming. In order to prevent this trouble, the embodiment provide an arrangement, wherein the pressing member 110 presses the upper portion of the already stored copying papers.

More specifically,, when a specified period has elapsed since the leading edge of a copying paper is detected by the phootosensor SE2, for example, at the timing when the paper is aligned in the corner (A) by the rotation of the paddle wheel 120, the solenoid SE2 is turned ON, thereby the pressing member 110 pivotally moves on the pivots 111 in the direction of an arrow (b), and the head 110a protrudes into the stapling tray 90 through the opening 93b on the guide plate 93 so as to press the upper portion of the papers S1 already stored (see FIG. 4). Consequently, the upper portion of the curled papers S1 is pressed toward the bottom of the stapling tray 90, that is, toward the guide plate, 92, in order to correct the curl of the copying papers (S1).

Further, since the solenoid SL3 is turned OFF at least immediately before the leading edge of the next paper S2 reaches the vicinity of the pressing member 110, the pressing member 110 pivotally moves in the direction reverse to an arrow (b) so as to cancel the pressing force on the stored papers S1.

The above mentioned operation corrects the curled upper portion, of the copying papers S1 already stored in the stapling tray 90, which faces the guide plate 93 side, and successfully prevents the jammed papers which may be caused by the interference between the copying paper S2 next transferred to the stapling tray 90 and the already stored and curled papers S1.

Additionally, as in the embodiment according to the present invention, when the head 110a of the pressing member 110 presses the upper portion of the copying papers S1, and if the pressing member 110 intersects the flexible sheets 105 at the notches 110b, the next copying paper is more readily stored in the stapling tray 90. More specifically, as shown in FIG. 4, while the head 110a of the pressing member 100 presses the upper portion of the copying papers S1 already stored, the flexible sheets 105 is positioned in the notchs 110b and not forced toward the left direction. Therefore, as shown in FIG. 5, the next transported copying paper S2 is stored in the stapling tray 90, as being sufficiently spaced from the copying papers S1 already stored, as in the case where the pressing member 110 is lifted off the stapling tray 90.

The above operation enables copying papers to be stored and correctly aligned in the stapling tray 90 sheet by sheet in the order of page while the copied image on each paper faces to the guide plate 93 side. When the previously mentioned ADF 30 with a document circulating function is used, the stapler 130 is actuated based on a stapling signal outputted at the timing synchronized with the completion of one cycle of copying operation and staples the copying papers of the stapling position (D). When the ADF 30 is not used, the stapler 130 is actuated and similarly staples the papers based on a stapling signal inputted by an operator.

Once the stapling operation has completed, the solenoid SL2 is turned ON, and the stopper 95 retreatss to a position indicated by the dashed line shown in FIG. 1 so as to open the bottom of the stapling tray 90. At the same time, the motor M2 is switched to reverse operation, and the paddle wheel 120 rotates in the direction reverse to an arrow (c), thereby, the stapled one set of papers is ejected downward from the stapling tray 90 because of the weight as well the actuating force generated by the rotation of the paddle wheel 120, turning to the right and downward in FIG. 2.

More specifically, the stapled one set of papers turns to the right by the actuating force due to the reverse rotation of the paddle wheel 120, thereby the stapled set is ejected while the stapled portion at first leaves the stapling position (D).

As described above, the one set of copying papers ejected from the stapling tray 90 is stacked in the stack box 161 shown in FIG. 7 or in the stack box 162 of the stack unit 160 shown in FIG. 6. When the set of copying is ejected from the stapling tray 90, the operations of the ADF 3 and the copying machine 1 restart to execute the next copying operation. Such a sequence of operations, including one cycle of copying operation and an operation of stapling duplicates prepared in the one cycle of copying operation, are repeated up to the number of sequences entered with the ten numerical keys.

[Constitution and operation of stack unit]

The stack unit 160 is described, below, by referring to FIG. 6.

The stack unit 160 is so arranged that the stack box 162 is connected through a fixture 164 to a belt 163 which is actuated by a motor M3 to rotate in the forward and reverse directions, in order to allow the upward or downward adjustment of the unit 160. Additionally, a photosensor SE4 for detecting the set of copying papers is aligned to openings 162a provided on both sides of the stack box 162 to detect the height of sets of copying papers stacked in the stack box 162.

More specifically, when each set of copying papers having been stapled is ejected from the stapling tray 90 and sequentially stacked in the stack box 162, and if the sensor SE4 detects the top of copying papers, the motor M3 is actuated to rotate in the direction of an arrow (d) and the stack box 162 moves downward in accordance with the rotation of the belt 163. As the stack box 162 moves downward, the top of copying papers is unlocked from the optical axis of the sensor SE4 and turns OFF the sensor, this in turn turns OFF the motor M3. Therefore, every set of copying papers is without fail ejected and stacked at a constant height.

[Control panel]

Figure 8:
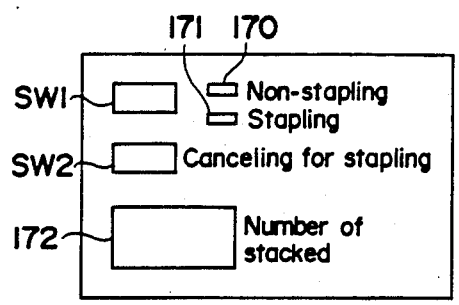

A control panel of the finisher unit 50 is described, below, by referring to FIG. 8.

SW1 is a mode select switch, and numeral 170 represents a non-stapling mode indicator LED, and numeral 171 represents a stapling mode indicator LED. In the starting stage, the non-stapling mode is started as a default mode. Every time the select switch SW1 is pressed, the stapling mode and the non-stapling mode are alternately designated, thereby the indicator LED 170 or 171 correspondingly lights up.

When using the previously mentioned ADF 30 to execute the stapling mode, the timing or the like of the stapling operation is automatically designated by communication between the ADF 30 and a controller on the copying machine 1, as described below. When the ADF 30 is not used to execute the stapling mode, the select switch SW1 is first pressed to designate the stapling mode, then, after the completion of a predetermined number of sets of copying papers, the select switch SW1 is pressed again to designate the non-stapling mode.

SW2 is a stapling mode canceling switch which cancels the stapling mode when pressed during the stapling mode with the ADF 30. For example, while preparing ten sets of copying papers, to staple eight sets of copying papers and to allow other two sets, pressing the canceling switch SW2 during the processing of the eighth set of copying papers, the ninth and tenth sets of copying papers are ejected to the paper ejection tray 80 without undergoing stapling.

Numeral 172 represents an indicator for indicating the number of stacked sets, that is, the number of stapled sets of copying paper. The numerical indication of the indicator 172 is incremented based on a signal from the controller on the copying machine 1, and the indicator 172 is reset based on a clear signal or the like from the controller.

[Control circuit]

Figure 9:
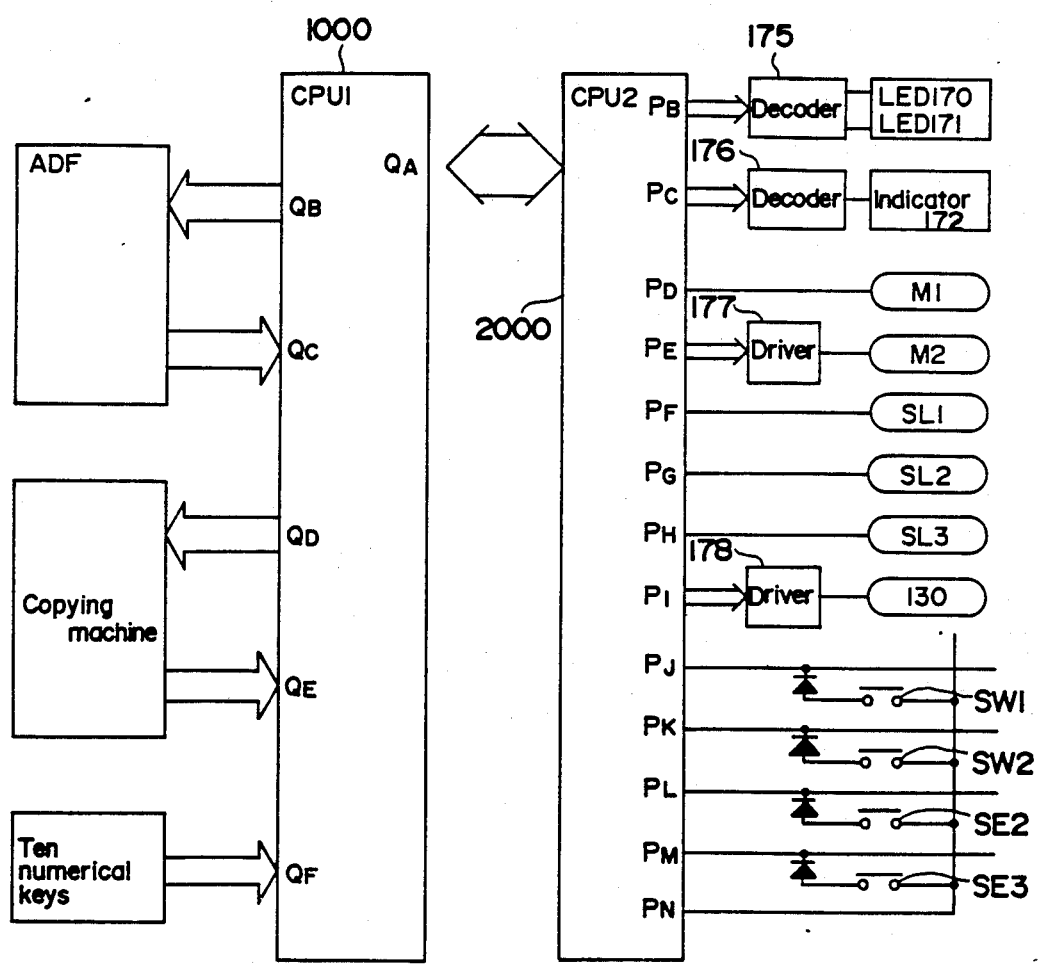

FIG. 9 illustrates a control circuit on the copying apparatus according to the invention. The first CPU 1000 controls the operations of the ADF 30 and copying machine 1. With the CPU 1000, a signal for controlling various movable elements on the ADF 30 is output from a port QB, and a signal indicating the status of the ADF 30 is inputted to a port QC. A signal for controlling various movable elements on the copying machine 1 is output from a port QD and a signal indicating the status of the copying machine 1 is inputted to a port QE. Into a port QF, a numeric data from the ten numeral keys is inputted.

The second CPU 2000 controls the operation of the finisher unit 50. With the CPU 2000, indicator LEDs 170 and 171 are connected to a port PB via a decoder 175, and the indicator 172 for the number of stacked sets of duplicates connected to a port PC via a decoder 176. The motor M1 for driving the rollers 60, 85 and 100 is connected to the port PD, and the motor M2 for driving the paddle wheel 120 is connected to a port PE via a forward/reverse capable driver 177. A port PF is connected to the solenoid SL1 for driving the diverting member 70; a port PG is connected to the solenoid SL2 for driving the stopper 95; and a port PH is connected to the solenoid SL3 for driving the pressing member 110. To a port PI, the stapler 130 is connected via a driver 178. Additionally, to ports PJ through PN, the switches SW1 and SW2, and the sensors SE2 and SE3 are correspondingly connected.

Further, the above first CPU 1000 and second CPU 2000 exchange an ADF signal, a stapling signal, a copy signal, an ejection signal and a copy wait signal via the ports QA and PA.

Figure 10:
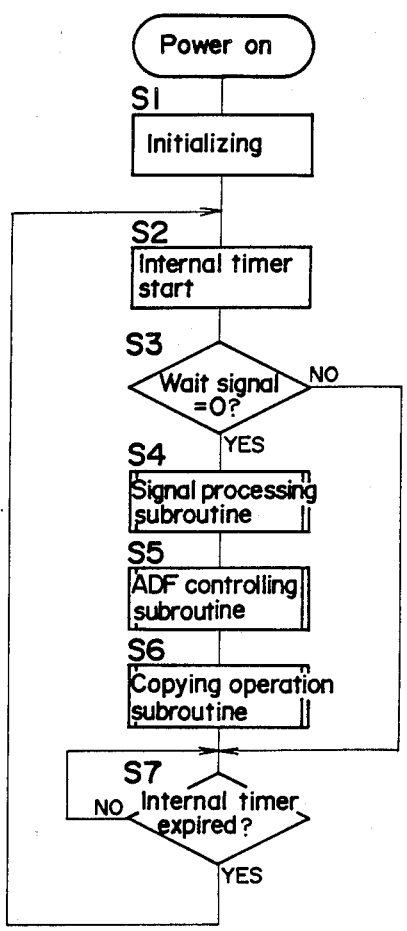

FIG. 10 is a flow chart schematically showing the processing operation carried out by the first CPU 1000.

When the power is turned ON, the first CPU 1000 is reset, and the program is started, clears a RAM and various resisters built in the first CPU 1000 and initializes various movable elements at step S1. Next, the internal timer is started at step S2. The internal timer decides a required duration of the routine of the first CPU 1000.

At stepe S3, the CPU 1000 judges the status of a wait signaltransferred from the second CPU 2000. If the level of wait signal is at "1", the CPU 1000 directly proceeds to step S7. If the level of wait signal is at "0", the CPU 1000 runs the signal processing subroutine at step S4, and runs the ADF controlling subroutine at step S5, then runs the subroutine for controlling copying operation at step S6, further proceeds to step S7.

At step S7, the CPU 1000 judges the completion of one cycle of the internal timer previously started at step S2. When it judges that one counting cycle of the internal timer has completed, the CPU 1000 returns to step S2.

Figure 11:
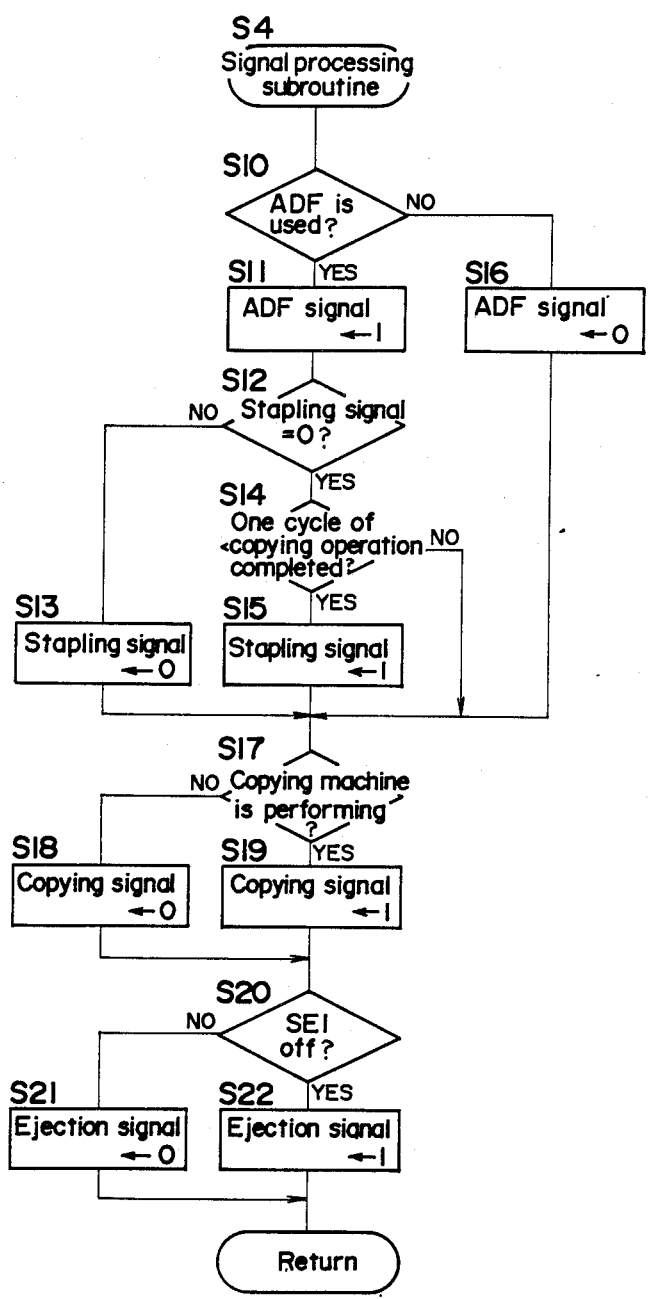

FIG. 11 is a flow chart showing the signal processing subroutine executed in the step S4 of the main routine.

First, whether or not the ADF 30 is currently used at step S10 is judged. If the ADF 30 is not used, an ADF signal is reset at the level of "0" at step S16, then the CPU 1000 proceeds to step S17. If the ADF 30 is currently used, the ADF signal is set at the level of "1" at step S11 and whether or not a stapling signal is at the level of "0" at step S12 is judged. If the stapling signal has been set at the level of "1", the stapling signal is set at the level of "0" at step S13 and the processing goes to step S17. If the stapling signal has been reset at the level of "0", whether or not one cycle of copying operation has completed at step S14 is judged. If one cycle of copying operation has completed, the processing goes to step S17. If one cycle of copying operation has not completed, the stapling signal is set at the level of "1" at step S15 and the processing goes to step S17.

At step S17, whether or not the copying machine 1 is performing a copying operation is judged. If the copying machine 1 is not performing a copying operation, a copy signal is set at the level of "0" at step S18. If the copying machine 1 is performing a copying operation, the copy signal is set at the level of "1" at step S19. Next, at step S20, whether or not the sensor SE1 is in the OFF status is judged. The sensor SE1 is turned OFF, when the leading edge of a copying paper leaves the pair of the ejection rollers 18 on the copying machine 1. Accordingly, when the sensor SE1 is in the ON status, an ejection signal is reset at the level of "0" at step S21. When the sensor SE1 is turned off, the ejection signal is set at the level of "1" at step S22, thereby the subroutine is terminated.

Figure 12:
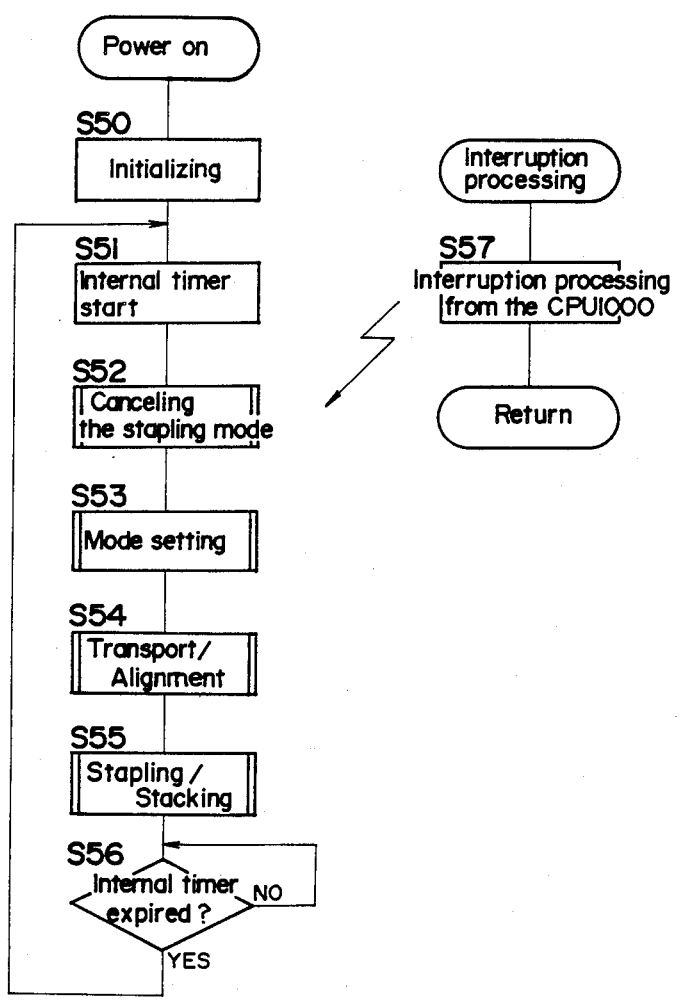

FIG. 12 is a flow chart showing the main routine of the second CPU 2000.

Once the second CPU 2000 is reset to start the program, first clears a RAM and initializes various registers and each unit. Next, the internal timer is started at step S51. The internal timer determines a duration required for one cycle of the main routine.

Then, the subroutines at steps S52 through S55 are called. When all the subroutines have been terminated, the second CPU 2000 at step S56 waits for the completion of counting cycle of the internal timer and returns to step S51. With various times used in various subroutines, the count of each timer is performed based on the duration of one cycle of the main routine.

Additionally, upon the interruption request from the first CPU 1000 on the copying machine 1, the second CPU 2000 executes the interruption processing at step S57.

Figure 13:
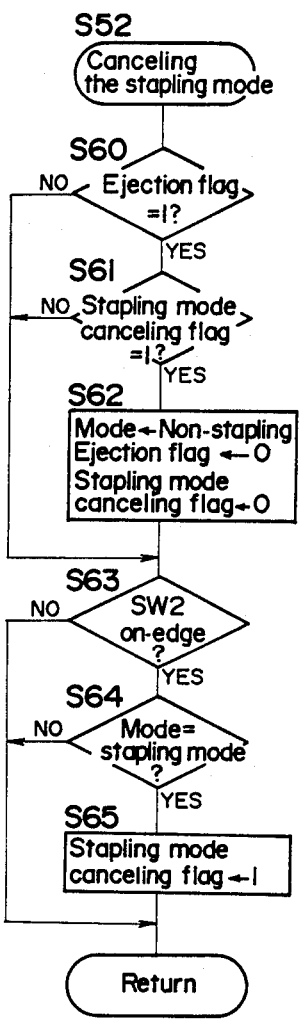

FIG. 13 is a flow chart showing the subroutine at step S52 for canceling the stapling mode.

First, whether or not an ejection flag is at the level of "1" at step S60 is judged, then whether or not a stapling mode canceling flag is at the level of "1" at step S61 is judged. The ejection flag is set at the level of "1" when the stapled set of copying papers is stored in the stack box 161, and is reset at "0" when the copying papers prepared in the next cycle of copying operation are stored in the stapling tray 90. Additionally, the stapling mode canceling flag is set at "1" when the canceling switch SW2 is turned ON. If both the ejection flag and the stapling mode canceling flag are set at the level of "1", the non-stapling mode as a current operation mode at step S62 is designated, and the ejection flag is set at "0" and the stapling mode canceling flag is reset at "0".

Next, whether or not the signaling status of the canceling switch SW2 is on-edge status at step S63 is judged. When the signal level is on-edge status, whether or not the stapling mode has been designated as a current operation mode at step S64 is judged. If the stapling mode has been designated, the stapling mode cancelling flag is set at the level of "1" at step S65. More specifically, the canceling switch SW2 is arranged so as to accept canceling instruction even during a copying operation, that is, so as to change the operation mode from the stapling mode to the non-stapling mode when the stapling mode cancelling flag is set at "1" and copying papers for current one cycle of copying operation are stapled then stored in the stack box 161 at steps S60 through S62.

Figure 14:
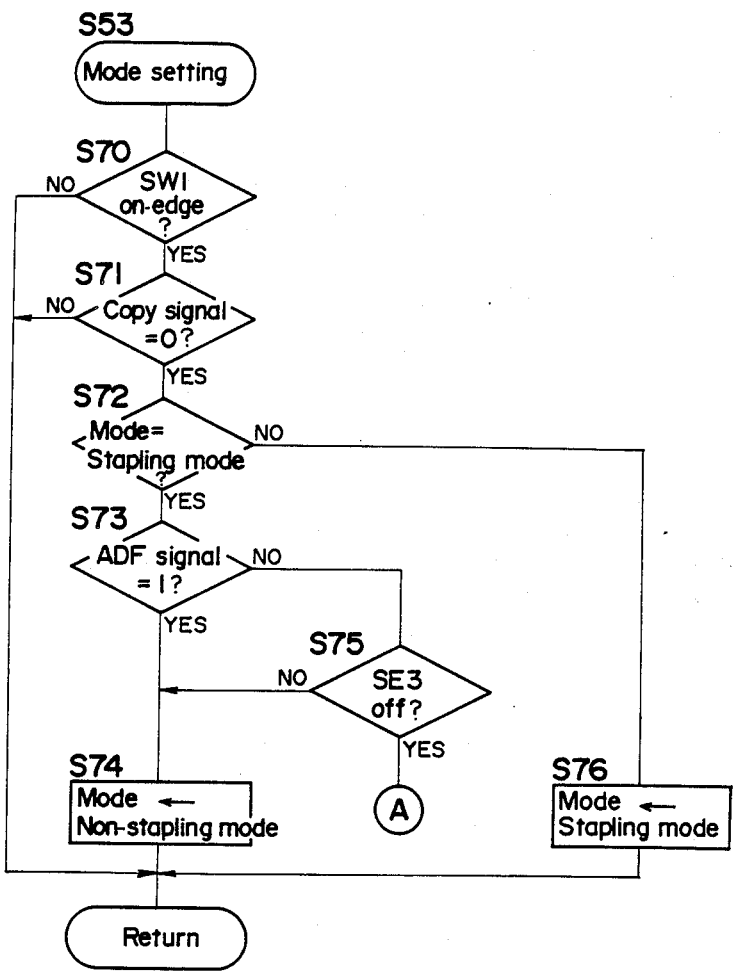

FIG. 14 is a flow chart showing the mode setting subroutine executed at step S53.

First, whether or not the signaling status of the mode select switch SW1 is on-edge status at step S70. When the similar status is on-edge status, whether or not the copy signal has been reset at the level of "0" at step S71 is judged. The level of the copy signal is maintained at "1" when the copying machine 1 is performing a copying operation. Accordingly, it is judged that the level of the copy signal is at "0" and the copying machine 1 is not performing a copying operation, whether or not the stapling mode has been designated as the current operation mode at step S72 is judged. If the stapling mode has not been designated, the stapling mode at step S76 is designated. If the stapling mode has been designated, whether or not the level of ADF signal is at "1" at step S73 is judged, that is, whether or not the ADF 30 is currently used for the copying operation. If the ADF 30 is used, the non-stapling mode is designated at step S74. If the ADF 30 is not currently used, whether or not the sensor SE3 for detecting a copying paper in the stapling tray 90 is in the OFF status at step S75 is judged. If the sensor SE3 has not been turned OFF, the stapling mode is similarly designated at step S74. If the sensor SE3 is put in the OFF status, the CPU 2000 proceeds to step S514 of the transport/alignment subroutin shown in FIG. 15b. More specifically, when the copying operation and the stapling operation are performed without using the ADF 30, the stapling operation is forcibly commenced by pressing the switch hSW1, since a signal for automatically executing the stapling operation (stapling signal) is not generated. Additionally, when the sensor SE3 is in the OFF status, the stapling operation is performed, since there are copying papers present in the staple tray 90. However, when the sensor SE3 is in the ON status, only the current operation mode is changed to the non-stapling mode, instead of executing the stapling operation, since there are no copying papers present in the stapling tray 90.

Figure 15A:
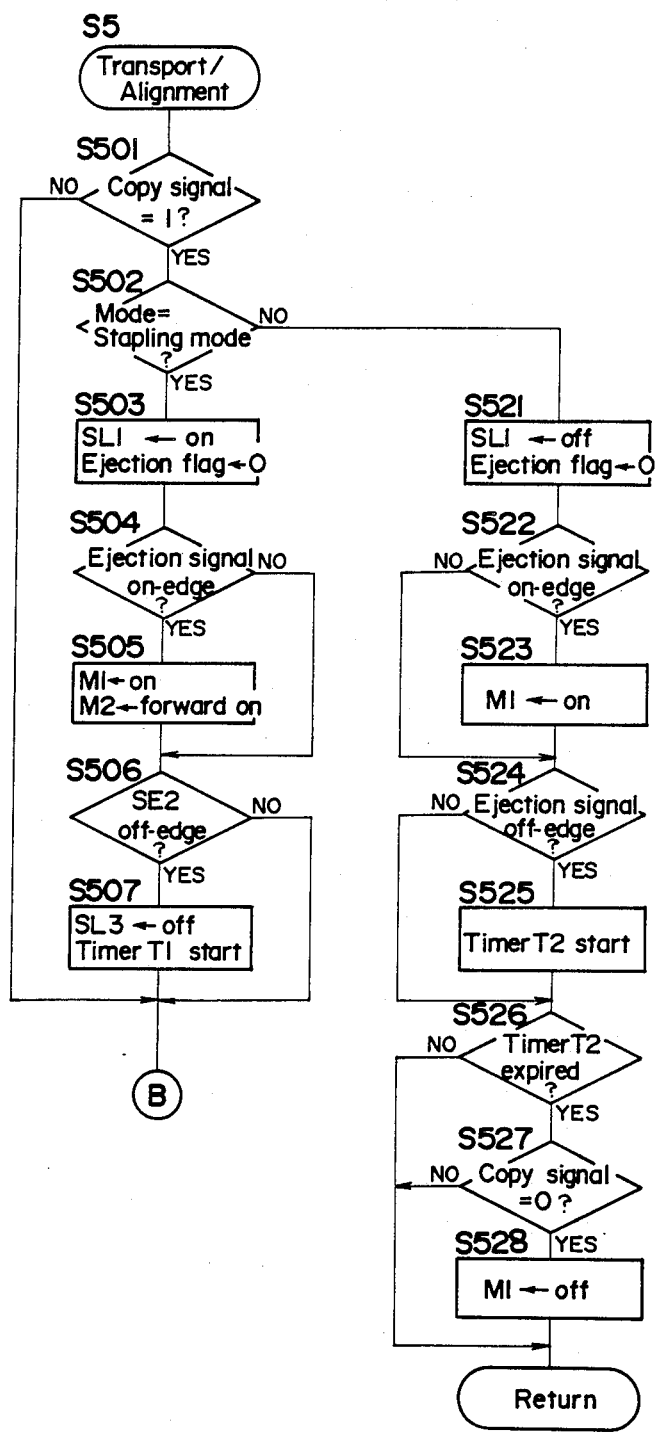
FIGS. 15a and 15b are flow charts showing a subroutine for paper transport/alignment.
Figure 15B:
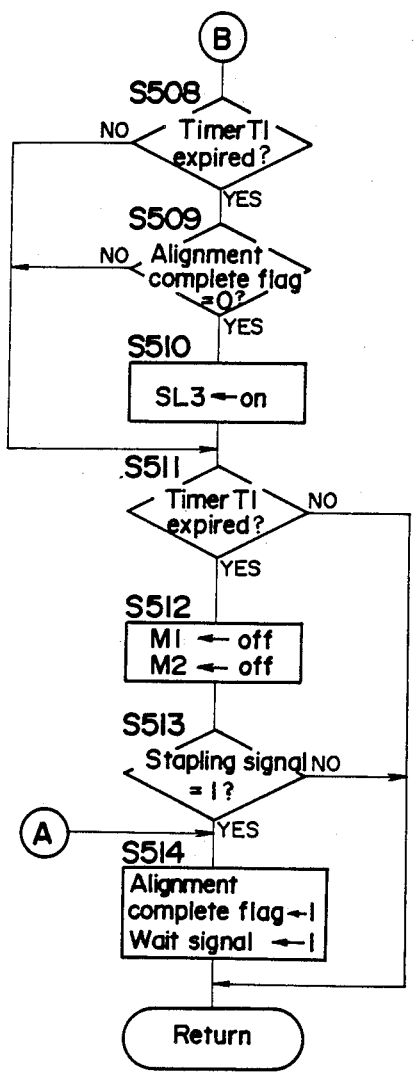

FIGS. 15a and 15b are flow charts showing the transport/alignment subroutine performed at step S54.

First, whether or not the level of copy signal is at "1" at step S501 is judged, and whether or not the stapling mode has been designated as the current operation mode at step S502 is judged. If the above two criteria are satisfied, at steep S503, the solenoid SL1 is turned ON, when the diverting member 70 shifts to the position indicated by the solid line in FIG. 1, and the ejection flag is reset at "0".

Next, the signaling status of the sensor SE1 located in the ejection area of the copying machine 1 is on-edge status at step S504 is judged, then at step S505 the motor M1 turns ON, and the motor M2 also turns ON to rotate in the forward direction, thereby the rollers 60, 85 and 100 are driven, and the paddle wheel 120 is actuated to rotate forward in the direction of the arrow (c).

Next, the signaling status of the sensor SE2 disposed on the stapling passage is in off-edge status at step S506 is judged, then at step S507 the solenoid SL3 turns OFF and a timer T1 starts. Turning OFF the solenoid SL3 retreats the head 110a of the pressing member 110 from the stapling tray 90. Then, once the the completion of one counting cycle of the timer T1 at step S508 is confirmed, whether or not the alignment complete flag is at the level of "0" at step S509 is judged. If the above two criteria are satisfied, at step S510 the slenoid SL3 turns OFF to insert the head 110a of the pressing member 110 into the stapling tray 90 and the head 110a presses the upper portion of the stored copying papers.

Also the completion of one counting cycle of the timer T1 at step S511 is confirmed, and at step S512 the motors M1 and M2 turn OFF. Whether or not the level of the stapling signal is at "1" at step S513 is judged. If the level of the stapling signal is at "1", at step S514, the level of the alignment complete flag is set at "1" to initiate the stapling operation, and the level of the wait signal is set at "1", in order to inhibit the operation of the copying machine 1. If the level of the stapling signal has been reset at "0", the processing returns to the main routine and proceeds to the next subroutine S55, because it is not definable as to whether or not the stapling operation should be initiated.

Additionally, if the criteria at previous step S502 are unsatisfactory and the non-stapling mode is executed, at step S521 first the solenoid S1 turns OFF and the diverting member 70 maintains in the position indicated by the dashed line in FIG. 1. At this time, the ejection signal is reset at "0". Then, the status of the ejection signal has been onedge at step S522 is confirmed, the motor M1 turns OFF in order to drive the rollers 60 and 85 at step S523.

Next, once the status of the ejection signal has been off-edge at step S524 is confirmed, a timer T2 starts step S525. The duration at which end a copying paper is completely ejected is incorporated into the timer T2. When the counting cycle of the timer T2 at step S526 is judged, and at next step S527 when the level of the copy signal is at "0", the motor M1 turns OFF at step S528 and processing terminates this subroutine.

Figure 16:
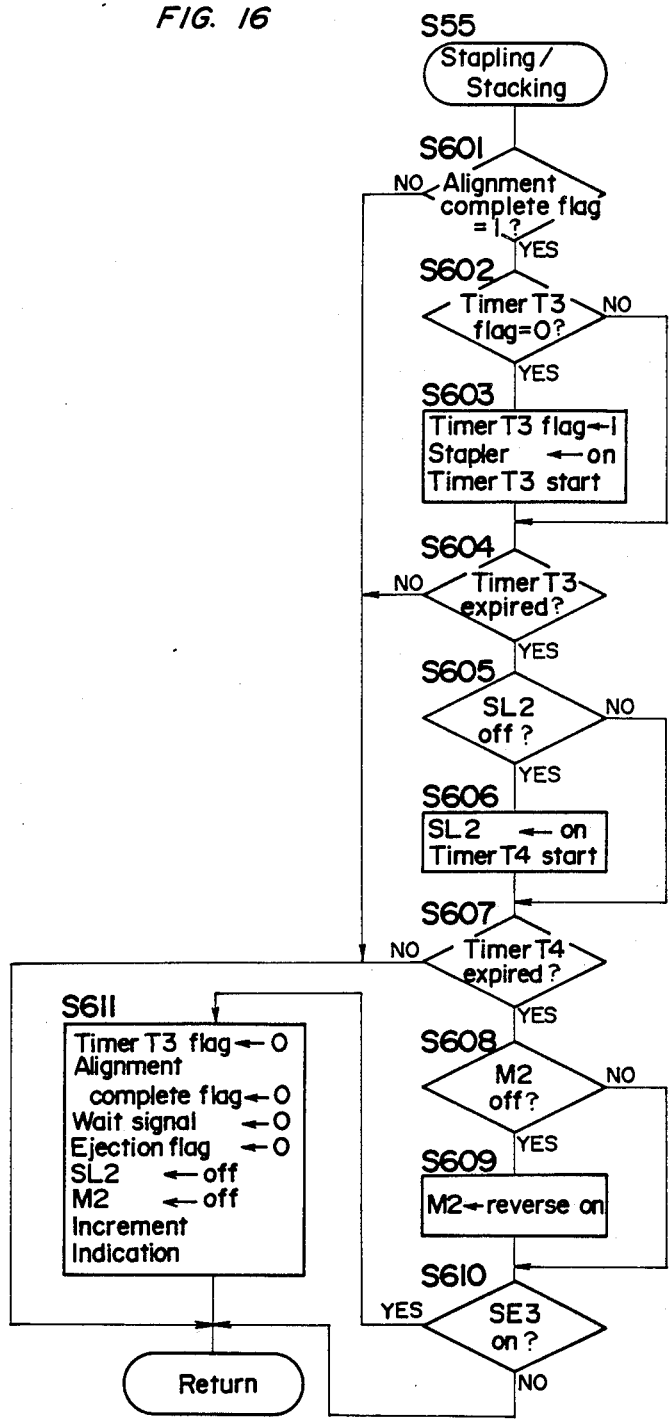

FIG. 16 illustrates the stapling/stacking subroutine commenced at step S55 in the main routine.

First, whether or not the level of the alignment complete flag is set at "1" at step S601 is judged. Then, whether or not the level of timer T3 flag is reset at "0" at step S602 is judged. If both the criteria are satisfied, which means the completion of alignment of copying papers stored within the stapling tray 90, at step S603 the level of the timer T3 flag is set at "1" and the stapler 130 is turned ON in order to staple the copying papers. Additionally, the stapler start signal is turned OFF instantaneously. At the same time, the timer T3 is started. The timer T3 serves to synchronize the timing to open up the stopper 95. Once the the completion of counting cycle of the timer T3 at step S604 is confirmed, at step S605 whether or not the solenoid SL2 has been turned OFF is judged. If the solenoid SL2 is at the OFF status, at step S606 the solenoid is turned ON to open up the stopper 95 and a timer T4 is started, which allows the stapled copying papers to fall freely. The timer T4 is provided to synchronize the timing to reverse the paddle wheel 120. When the completion of one counting cycle of the timer T4 is detected at step S607, the motor M2 is in the OFF status is detected at step S608, and the motor M2 actuates in the reverse direction at step S609, so as to turn the paddle wheel 120 in the direction reverse to the arrow (c). This arrangement allows copying papers to fall while turning to the right direction in FIG. 2, thereby the stapled set of the copying papers is ejected from the stapling tray 90 while the stapled portion does not interfere with the stapling position (D).

Next, whether or not the sensor SE3 which detects the copying papers stored in the stapling tray 90 is in the ON status at step S610 is judged. If the sensor SE3 is in the ON status, which means that set of the copying papers ejected from the stapling tray 90 has been detected, at step S611 the timer T3 flag, the alignment complete flag and the wait signal are reset respectively at the level of "0", and the ejection flag is set at the level of "1", and simultaneously, the solenoid SL2 and the motor M2 are turned OFF, then the second CPU 2000 increments the number of stacked sets of the display 172, and indicates the number with a display 172.

[Other embodiment]

As described above, in the above embodiment, once the sensor SE2 detects the leading edge of the next copying paper [indicated by YES at step S506], the solenoid SL3 is turned OFF to release the pressure exerted by the pressing member 110 upon the stored papers [step S507]. In this case, the satisfactory timing of releasing the pressure is at least immediately before the leading edge of the next copying paper reaches the vicinity of the head 110a. Additionally, the timing at which the solenoid SL3 is turned ON to have the pressing member 110 press the copying paper is not necessarily limited to the above step S510.

Figure 17:
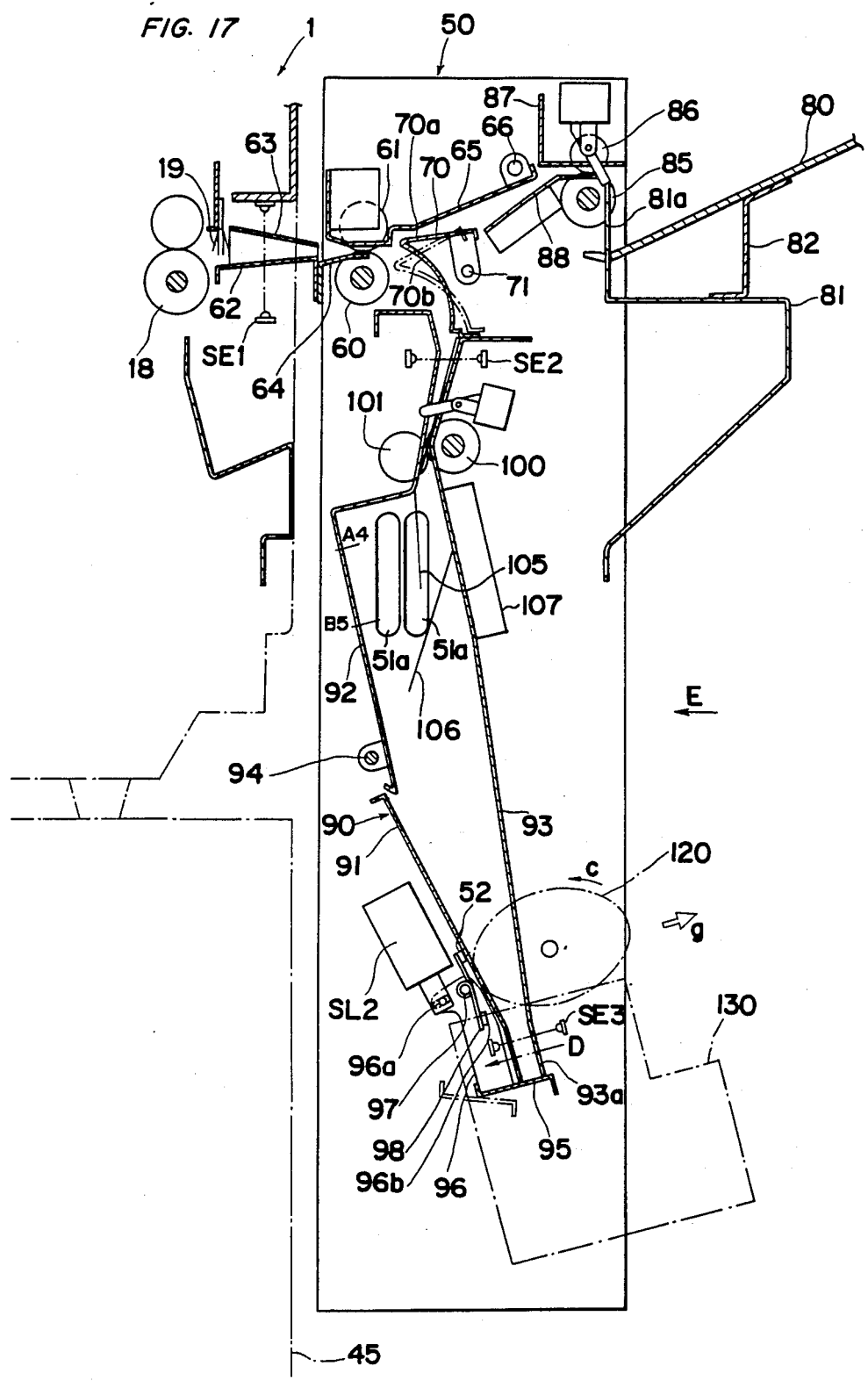
FIG. 17 is an internal composition showing a paper container of another embodiment.
Figure 18:
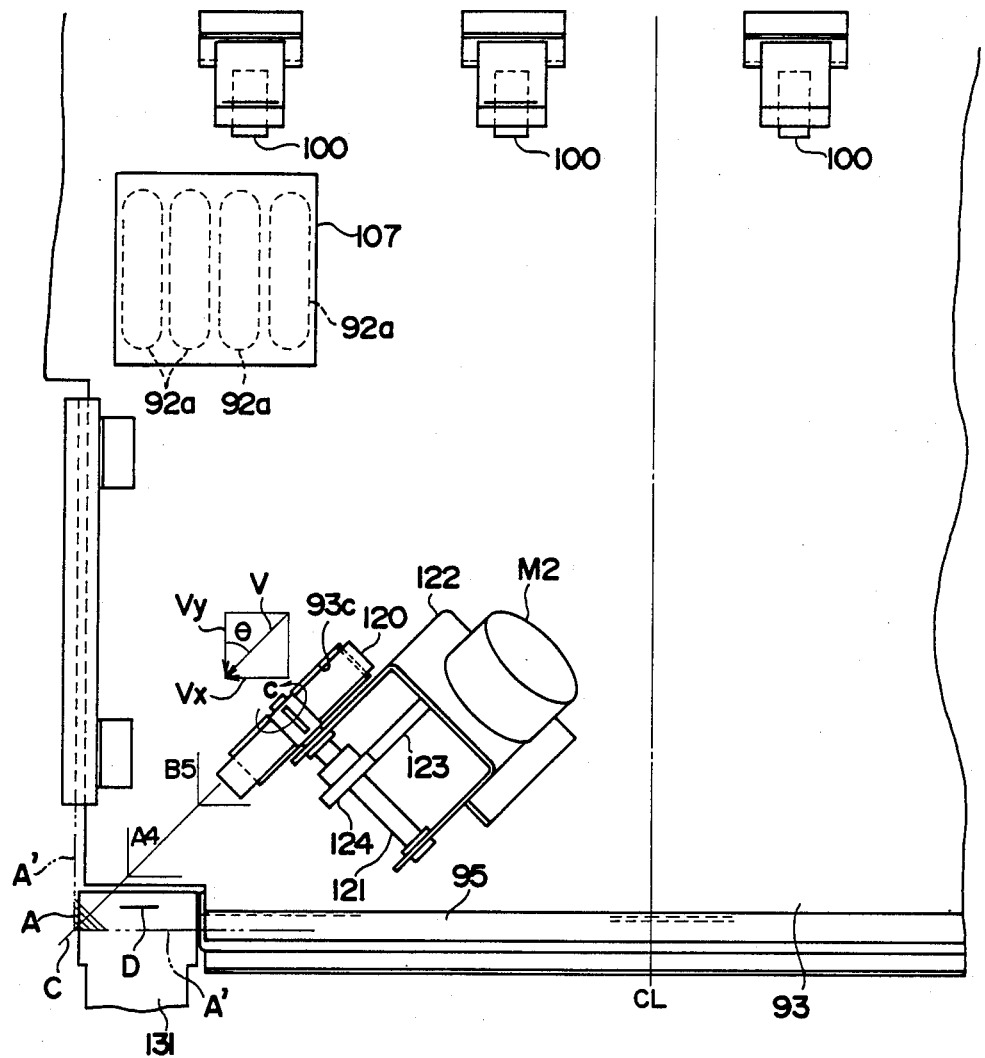
FIG. 18 is a side elevational view taken in the direction of the arrow E in FIG. 17.

Instead of the pressing member 110, an arrangement may be incorporated, as shown in FIGS. 17 an 18, to correct the curled area around the upper portion of copying papers stored in the stapling tray 90; a fan 107 is disposed on the external left or right side of the guide plate 93, thereby an air flow from the fan 107 is directed into the stapling tray 90 then to the upper portion of the stored copying papes. In this case, the air flow is readily directed to the upper portion of the stored copying papers, since slits 51a are formed on the frame 51, slits 92a are formed on the guide plate 92 so as to these slits are in positions directly facing the fan 107. Additionally, such a fan 107 is energized only when the curl of copying papers is extremely large.

The length of the flexible sheets 105, which is provided to ensure smooth storage of a copying paper, may be smaller, as indicated by FIG. 17.

Furthermore, in the above embodiment, the rotation of the paddle wheel 120 is reversed when ejecting stapled papers from the stapling tray 90. However, if the stroke of stapler 130 is large and if the stapling position (D) is out of an area to which a copying paper falls, it is not necessary to reverse the rotational direction of the paddle wheel 120. The paddle wheel 120 may be shifted outward (arrow (g) direction, see FIG. 1) to ensure the smooth fall of copying papers, or turned forward in the arrow (c) direction.

Although the present invention has been described in connection with the preferred embodiment thereof, it is to be noted that various changes and modifications are apparent to those skilled in the art. Such changes and modifications are to be understood as included within the scope of the present invention as defined by the appended claims, unless they depart therefrom.

What is claimed is:

1. A copying apparatus, comprising:
    image forming means for forming a duplicate sheet of a document placed in an exposure position;
    a circulating automatic document feeding unit which has a document container for storing one set of documents stacked in order, wherein the documents are transported sheet by sheet from the document container to the exposure position and again stored in the container after the exposure;
    means for storing duplicated sheets, said storing means including means for stapling one set of the duplicated sheets stored in the storing means;
    means for entering a number of copies to be prepared per one set of documents;
    first control means for operating continuously both the image forming means and the circulating automatic document feeding unit until the image forming operation for a specific number of sets of copies has been completed, the specific number being the number entered by the number entering means;
    means for selecting either a stapling mode or a non-stapling mode;
    second control means for controlling the storing means in the stapling mode and in the non-stapling mode, wherein when in the stapling mode the storing means stores the duplicated sheets and the stapling means operates every time after a completion of the storing operation for stapling each set of duplicating sheets, and when in the nonstapling mode the storing means stores the duplicated sheets without operating the stapling means; and
    third control means, responsive to the selection of the non-stapling mode during the storing operation in the stapling mode, for controlling said storing means in the non-stapling mode after the completion of the storing and stapling operation to the set of copies currently being stored.

2. A copying apparatus as claimed in claim 1, wherein the storing means comprises:
    a tray for storing copying papers;
    means for transporting copying paper to the tray;
    means for pressing stored copying papers on the tray; and
    means for operating the pressing means in synchronization with a copying paper transporting operation.

3. A copying apparatus as claimed in claim 1, wherein the storing means comprises:
    first means for storing copying papers;
    second means for storing copying papers
    means for diverting selectively transporting copying paper either to the first storing means or the second storing means; and
    means for controlling the diverting means in order to transport copying paper to the first storing means if the stapling mode has been selected, and to the second storing means if the non-stapling mode has been selected.

4. A copying apparatus as claimed in claim 1, further comprising means for indicating a number of sets of copies to be prepared, per one set of copies, and where the number has been entered by the numeral entering means.

5. A copying apparatus, comprising:
    image forming means for forming a duplicate sheet of a document placed in an exposure position;
    a circulating automatic document feeding unit which has a document container for storing one set of documents stacked in order, wherein the documents are transported sheet by sheet from the document container to the exposure position and again stored in the container after the exposure;
    means for storing duplicated sheets, said storing means including means for stapling one set of the duplicated sheets stored in the storing means;
    means for entering a number of copies to be prepared per one set of documents;
    first control means for operating continuously both the image forming means and the circulating automatic document feeding unit until the image forming operation for a specific number of sets of copies has been completed, the specific number being the number entered by the number entering means;
    means for selecting either a stapling mode or a non-stapling mode;
    second control means for controlling the storing means in the stapling mode and in the non-stapling mode, wherein when in the stapling mode the storing means stores the duplicated sheets and the stapling means operates every time after a completion of the storing operation for stapling each set of duplicated sheets, and when in the nonstapling mode the storing means stores the duplicated sheets without operating the stapling means; and
    third control means which allows the designation of the non-stapling mode during the image forming operation in the stapling mode before the specific number, which has been instructed by the number entering means, of sets of copies have been completed.

* * * * *